March 4, 1952 — A. Y. DODGE — 2,587,712
OVERLOAD RELEASED CLUTCH
Filed Sept. 29, 1945
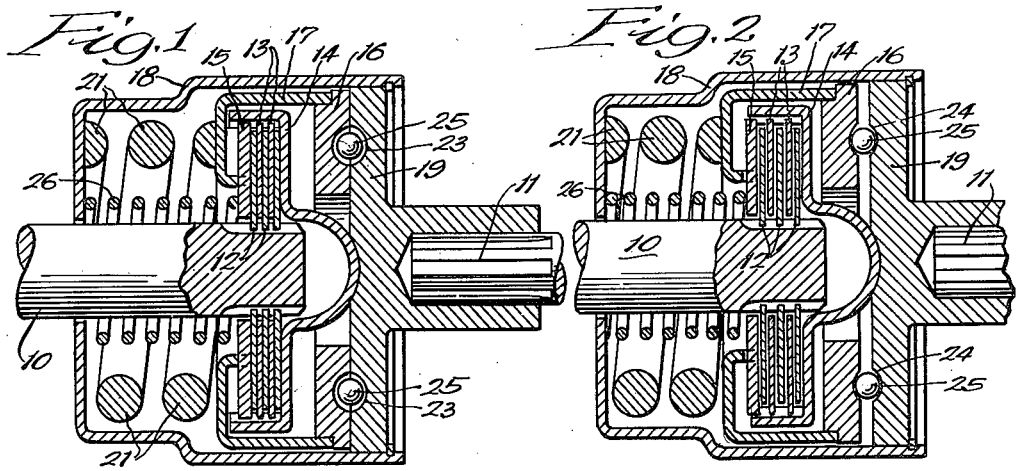
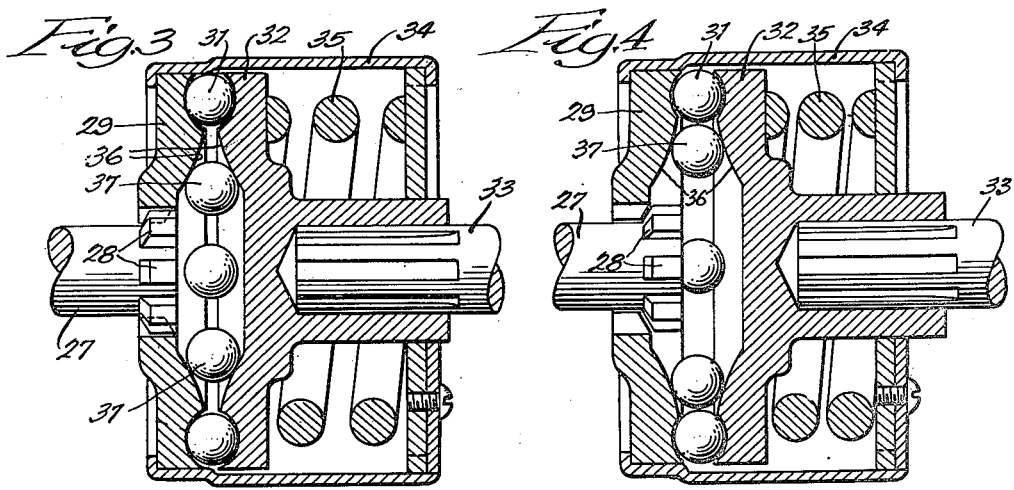
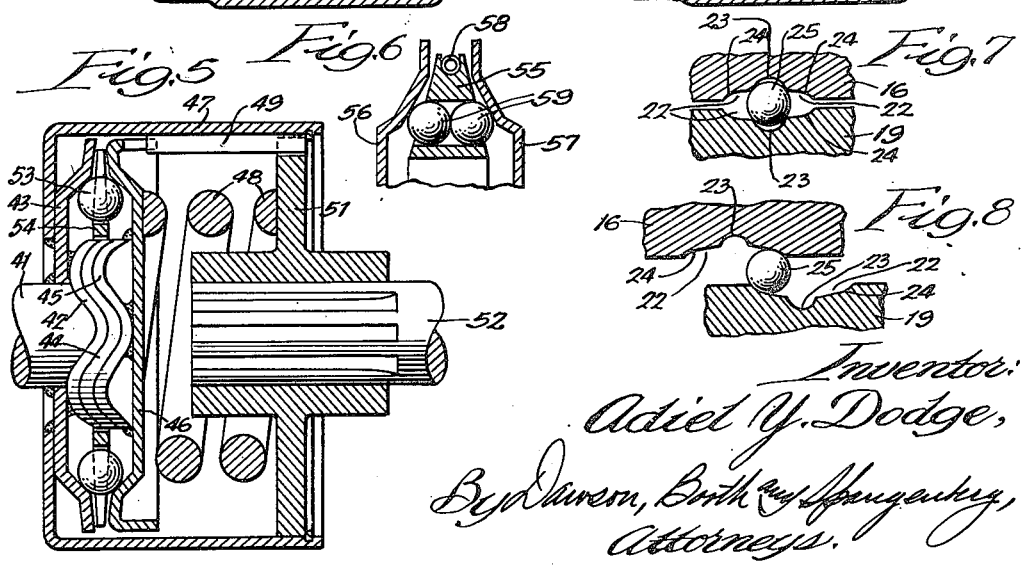

Patented Mar. 4, 1952

2,587,712

UNITED STATES PATENT OFFICE 2,587,712

OVERLOAD RELEASED CLUTCH

Adiel Y. Dodge, Rockford, Ill.

Application September 29, 1945, Serial No. 619,381

4 Claims. (Cl. 192—103)

This invention relates to couplings and more particularly to couplings of the type that release in response to torque.

One of the objects of the invention is to provide a coupling which will release in response to a predetermined torque in either direction.

Another object is to provide a coupling which is released by a camming action produced by balls or the like in recesses which are so shaped as to provide different cam angles in different positions of the coupling parts.

Still another object is to provide a coupling which disengages in response to a combination of speed and torque.

A further object is to provide a coupling which will be held disengaged in response to speed. According to one feature of the invention, the speed responsive means has a greater mechanical advantage over the engaging spring in the disengaged position of the parts than in their engaged position.

The above and other objects and advantages of the invention will be more readily apparent from the following description, when read in connection with the accompanying drawing in which:

Figure 1 is an axial section through a coupling showing the parts in engaged position;

Figure 2 is a similar view showing the parts in disengaged position;

Figures 3 and 4 are views corresponding to Figures 1 and 2 respectively of another coupling construction;

Figure 5 is a view similar to Figure 1 of still another coupling construction;

Figure 6 is a partial section illustrating an alternative weight construction; and Figures 7 and 8 are partial sections illustrating the cam balls in engaged and disengaged positions of the coupling respectively.

The coupling of Figure 1 is adapted to connect a shaft 10 to a shaft 11, either of which may be the driving shaft, and between which torque may be transmitted in either direction. The shaft 10 forms one of the coupling members and is grooved at its end slidably to connect to a series of clutch plates or discs 12 which are interleaved with similar plates or discs 13 splined to a supporting structure 14. The discs are adapted to be pressed together by a pressure plate 14 splined to the support 14.

The disc 15 is connected to a ring 16 through a casing part 17. As shown, the casing part 17 turns inwardly over the pressure plate 15 and is connected thereto through a sliding joint provided, for example, by projections on the casing part 17 extending into openings in the pressure plate 15. A housing 18 encloses the coupling parts and is connected to a flange 19 or hub member secured to the shaft 11. A main spring 21 within the housing 18 engages the casing part 17 and through it urges the clutch discs into engagement and the ring 16 toward the flange 19.

The ring 16 is connected to the flange 19 to transmit torque therebetween and to urge the ring away from the flange in response to torque.

As best seen in Figures 7 and 8, the flange and the ring are formed with registering recesses 22 having central portions with their sides diverging at a relatively acute angle as shown at 23 and end portions whose bottoms lie more nearly parallel to the planes of the ring and the flange. The recesses are adapted to receive balls 25 which lie in the enlarged central portions of the recesses to engage the sharply angular sides 23 when the ring is adjacent the flange.

Figure 1 illustrates the coupling with the parts in engaging position in which the balls 25 lie in the enlarged central portions of the recesses and the spring 21 presses the clutch discs together. In this position torque is transmitted from the shaft 10 through the clutch discs and pressure plate 15 to the ring 16. The ring drives the flange 19 through the balls 25 to transmit torque to the shaft 11. When the torque reaches a predetermined value fixed by the strength of the spring 21 and the angle of the recess sides 23, the cam action of the balls against the recess sides will move the ring 16 to the left against the spring 21. This relieves the pressure of the spring 21 on the clutch discs to disconnect the clutch and permit the shafts to turn relative to each other.

When the balls act to separate the flange and ring in response to torque, they move into the end portions of the recesses as shown in Figure 8. At this time the balls engage the relatively flat bottoms 24 of the recesses so that their mechanical advantage over the spring is substantially increased and the spring will be held compressed in response to a relatively light torque, substantially smaller than that required to move the balls out of the central portions of the recesses. The clutch will, therefore, not re-engage until the torque has been reduced to a value substantially lower than that required to disengage it.

To maintain a relatively light drag sufficient to hold the balls in the end portions of the recesses, a light secondary spring 26 is provided in the housing directly engaging the pressure plate 15. The spring 26 is not affected by movement of the ring 16 so that it will maintain a light pressure on the clutch discs sufficient to hold the balls in the end portions of the recesses.

Figures 3 and 4 illustrate an alternative construction in which a shaft 27 is formed at its end with a series of outwardly projecting clutch teeth 28 adapted to engage internal teeth on a ring 29 which is movable axially relative to the shaft 27. The ring 29 is connected through balls 31 to a flange 32 on a shaft 33. The balls 31 operate in recesses in the ring 29 and flange 32 similar to the recesses 22 described above.

The ring 29 is connected to a housing 34 which extends over the flange 32 and encloses a spring 35 engaging the flange to urge the ring and the flange together. When the ring and the flange are together, as shown in Figure 3, torque will be transmitted from the shaft 27 through the clutch teeth 28 to the ring 29 and through the balls 31 to the flange 32 and shaft 33. When the torque reaches a predetermined value, the balls 31 will cam the ring 29 to the left, as shown in Figure 4, to disconnect the shaft 27 and ring 29.

In order to hold the coupling in its disengaged position, the facing surfaces of the ring 29 and the flange 32 are tapered as indicated at 36 to converge outwardly. The tapered surfaces are curved as shown so that they provide a greater angle at their inner portions than at their outer portions. Weights in the form of balls 37 are arranged between the surfaces 36 and tend to move outward in response to centrifugal force when the coupling is rotating.

With the coupling in engaged position, the balls engage the sharply angular inner portions of the surfaces 36 so that they have a very low mechanical advantage over the spring 35. The balls thereby exert a relatively small axial force tending to compress the spring and disengage the coupling. When the coupling parts are disengaged, as shown in Figure 4, the balls move outward to the nearly parallel outer portions of the surfaces 36 so that they have a high mechanical advantage over the spring. Therefore, a relatively small centrifugal force on the balls will hold the spring compressed so that the coupling parts can run with no drag. It will be understood that by properly proportioning the weight of the balls and the angles of the cam surfaces, the effect of speed on the engagement and disengagement of the coupling can be varied as desired.

Figure 5 illustrates still another construction in which a shaft 41 has secured to its inner end a sinuous clutch plate 42 and a cam ring 43. The plate 42 is adapted to engage an intermediate sinuous plate 44 and an outer sinuous plate 45 connected to a cam ring or disc 46. The plate 44 is connected to a housing 47 enclosing a spring 48 which engages the ring 46 to urge the rings together and the clutch parts into engagement.

The ring 46 is connected through elongated slots and bars or rods 49 to a flange 51 carried by a shaft 52. When the coupling parts are in their engaged position, as shown, torque is transmitted from the shaft 41 through the clutch plates 42, 44 and 45 to the ring 46. From the ring 46 torque is transmitted through the rods or bars 49 to the flange 51 and the shaft 52.

When the torque reaches a predetermined value, the clutch plates will separate due to the sinuous formation which provides a camming action to move the ring 46 to the right against the spring 48. At this time the shaft 41 can rotate relative to the ring 46 so that no torque will be transmitted to the shaft 52.

To hold the clutch parts in disengaged position, the rings 43 and 46 are formed adjacent their periphery with annular cam surfaces providing a relatively wide cam angle at their inner portions and relatively flat angles at their outer portions. Balls 53 operate between the cam surfaces and are held properly spaced to rotate there between by a cage 54. With the clutch parts engaged, the balls engage the relatively wide angle cam surfaces so that they have a small mechanical advantage and a relatively small effect on the spring 48. When the clutch parts are disengaged, however, the balls ride against the relatively flat outer cam portions so that they have a high mechanical advantage over the spring and will hold the coupling parts disengaged in response to a relatively low speed. Therefore, the coupling parts can over run with a minimum of drag and wear.

Instead of using single balls, as shown in Figures 3, 4 and 5, weights may be employed of the type illustrated in Figure 6. In this construction weight segments 55 are arranged in annular array between the cam discs 56 and 57 which are shaped to provide cam surfaces lying at different angles. The weights are urged together by a coil spring 58 and are transversely bored to receive balls 59 which engage the cam surfaces. With this construction the balls 59 will roll against the cam surfaces and against each other to reduce friction and sliding to a minimum, thereby increasing the accuracy of the response to centrifugal force. Furthermore, with this construction the weights 55 can be made as heavy as desired so that the effect of speed on operation of the coupling can be readily controlled.

While several embodiments of the invention have been shown and described in detail, it will be understood that these are illustrative only and are not to be taken as a definition of the scope of the invention, reference being had for this purpose to the appended claims.

What is claimed is:

1. A coupling comprising coaxial coupling members, a pair of elements formed with annular cam surfaces, one of said elements being connected to one of the members and the other being movable axially relative thereto, means to connect the other of said elements to the other member, means to connect the elements and to urge them apart in response to torque, one of the connecting means forming a clutch controlled by said elements to be disengaged when they are apart, a spring urging the elements together, and centrifugally responsive weights between the cam surfaces, the cam surfaces having inner portions lying at a relatively wide angle engaging the weights when the elements are together and outer portions lying at a smaller angle to engage the weights when the elements are apart.

2. A coupling comprising a pair of coaxial coupling members, a flange on one of the members, a ring movable axially relative to the flange, means to connect the ring to the other member, means to connect the ring and the flange and to urge them apart in response to torque, one of the connecting means forming a clutch which is disengaged when the ring and flange are apart, a spring urging the ring and flange together, the facing surfaces of the ring and flange converging outward at a more rapid rate at their inner than at their outer portions, and centrifugal weights between said surfaces.

3. A coupling comprising a pair of coaxial coupling members, a flange on one of the members, a ring movable axially relative to the flange, cooperating clutch parts connected to the ring and the other member to connect them when the ring is adjacent the flange and to disconnect them when the ring is spaced from the flange, a spring urging the ring toward the flange, the ring and flange being formed in their adjacent faces with registering recesses, balls in the recesses to connect the ring and flange and to urge them apart in response to torque, the facing surfaces of the ring and flange converging outward at a greater angle at their inner portions than at their outer portions, and centrifugal weights between the ring and flange engaging said surfaces.

4. A coupling comprising a pair of coaxial coupling members, a flange on one of the members, a ring movable axially relative to the flange, means slidably connecting the ring to the other member, cooperating clutch parts on the ring and the flange to connect them and to urge them apart in response to torque, a spring urging the ring and the flange together, the facing surfaces of the ring and the flange converging outward at a greater angle at their inner portions than at their outer portions, and centrifugal weights between the ring and the flange engaging said surfaces.

ADIEL Y. DODGE.

REFERENCES CITED

The following references are of record in the file of this patent:

UNITED STATES PATENTS

| Number | Name | Date |
| --- | --- | --- |
| 1,585,140 | Erban | May 18, 1926 |
| 1,711,520 | Decker | May 7, 1929 |
| 1,739,947 | Chilton | Dec. 17, 1929 |
| 1,883,164 | Vassakos | Oct. 18, 1932 |
| 1,909,366 | Koza | May 16, 1933 |
| 2,002,699 | Larsen | May 28, 1935 |
| 2,079,678 | Chilton | May 11, 1937 |
| 2,160,150 | Jimerson et al. | May 30, 1939 |
| 2,209,155 | Fagg | July 23, 1940 |
| 2,366,841 | Dodge | Jan. 9, 1945 |
| 2,368,299 | Hayter | Jan. 30, 1945 |
| 2,373,666 | Emery | Apr. 17, 1945 |